United States Patent [19]

Long

[11] 4,400,084
[45] Aug. 23, 1983

[54] PHOTOGRAPHIC EXPOSURE MASKS

[75] Inventor: John G. Long, Leatherhead, England

[73] Assignee: Durst (U.K.) Limited, Epsom, England

[21] Appl. No.: 328,071

[22] Filed: Dec. 7, 1981

[30] Foreign Application Priority Data

Dec. 22, 1980 [GB] United Kingdom ............... 8041017

[51] Int. Cl.³ ............................................. G03B 27/58
[52] U.S. Cl. ........................................ 355/74; 355/126
[58] Field of Search ............... 355/54, 72, 74, 7, 126

[56] References Cited

U.S. PATENT DOCUMENTS

| | | | |
|---|---|---|---|
| 2,891,443 | 6/1959 | Pollock | 355/74 X |
| 3,488,119 | 1/1970 | Dixon et al. | 355/74 |
| 3,674,365 | 7/1972 | Köhler et al. | 355/74 X |
| 3,732,010 | 5/1973 | Hartery et al. | 355/74 X |
| 3,737,227 | 6/1973 | Harter et al. | 355/74 |
| 3,807,861 | 4/1974 | Nosco et al. | 355/74 X |
| 4,320,965 | 3/1982 | Kimura et al. | 355/74 |
| 4,325,630 | 4/1982 | Kimura et al. | 355/74 |

Primary Examiner—Richard A. Wintercorn
Attorney, Agent, or Firm—Cahill, Sutton & Thomas

[57] ABSTRACT

An exposure mask 9 for photographic material 4 includes a measuring wheel 23 and two adjustable mask blades 19 and 20. Movement of the photographic material 4 causes rotation of the wheel 23, which causes a switching member 34 to approach a switch 42. When the switching member 34 reaches the switch 42 it stops the transport of the material 4. Adjustment of one mask blade 20 adjusts the initial distance between the switching member 34 and the switch 42.

6 Claims, 4 Drawing Figures

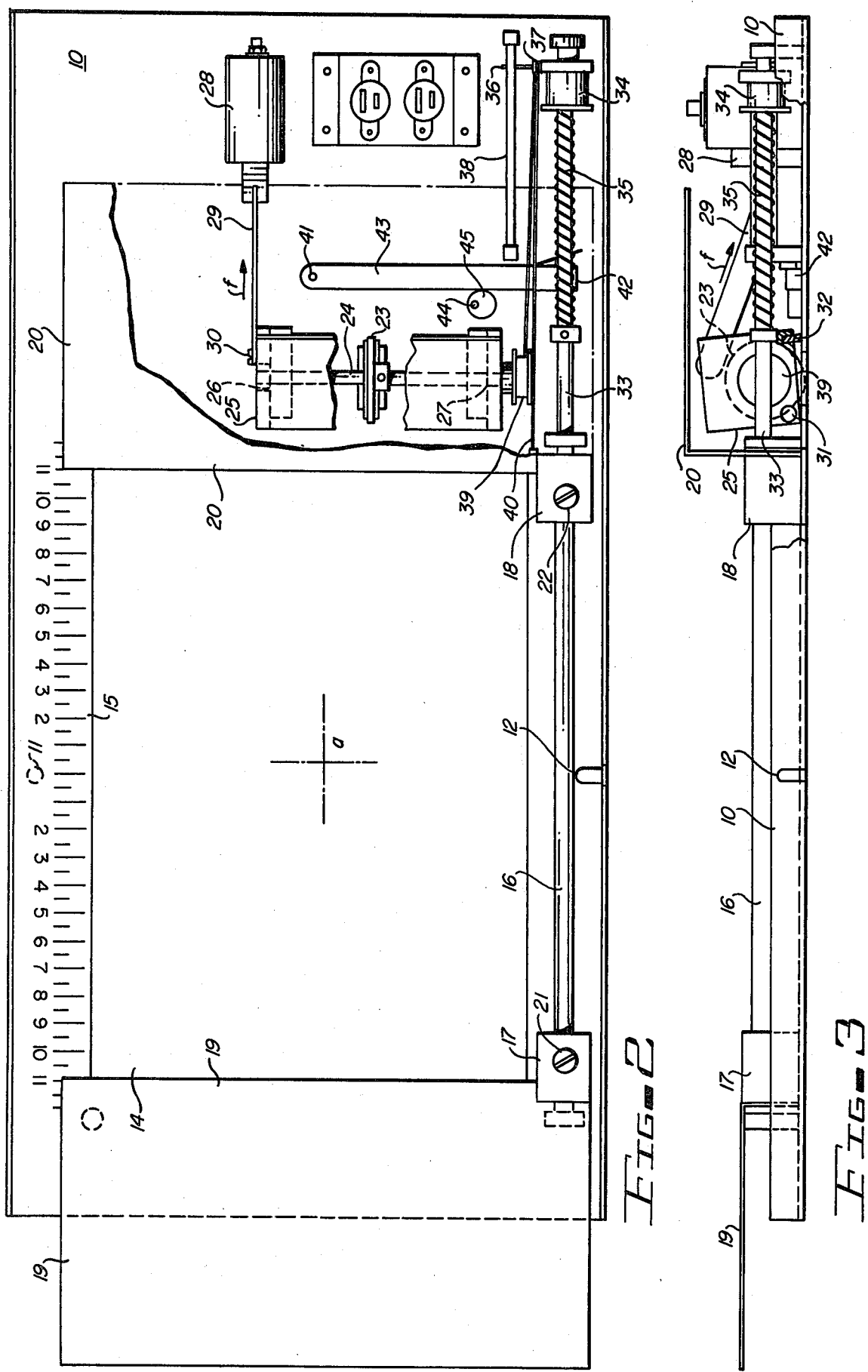

PHOTOGRAPHIC EXPOSURE MASKS

BACKGROUND OF THE INVENTION

The invention relates to an exposure mask with a measuring wheel and a switching means to control a transport unit for photographic material.

In previously proposed transport units for photographic paper, for example, in photographic roll printing apparatus, the transport distance by which the paper is advanced at the end of each printing operation is measured by means of a measuring wheel attached to a paper mask. The measuring wheel acts on a switching means, for example, a micro-switch, by way of a transmission member, in such a way that a paper transport motor switched on at the start of the transport is switched off after a number of rotations of the measuring wheel corresponding to the desired transport distance. The diameter of the measuring wheel and the transmission member, which may for example contain a gear, are so matched to each other that the transport distance is suitable for the dimensions of the light passage aperture of the paper mask, and therefore the print size which is to produced. In such previously proposed roll printing apparatus, therefore, a separate mask with a separate transport measuring device, which in each case contains a measuring wheel, is required for each print size. As a result, the user of such apparatus must acquire for each print size required a paper mask which is relatively expensive, particularly owing to the cost of the transport measuring device, but many of these masks, for example, a mask for exposing test strips, are used relatively rarely.

SUMMARY OF THE INVENTION

It is an object of the invention to provide an exposure mask which is suitable for a range of print sizes, with the transport being matched in each case to the size of print being produced.

The invention provides an exposure mask for photographic material comprising a measuring wheel arranged in use to be caused to rotate by the transport of photographic material past the mask, switching means, a switching member that in use is caused to move towards and operate the switching means in response to the said rotation of the measuring wheel, and at least one adjustable covering member that in use defines an edge extending transversely of the direction of photographic material transport of an aperture through which light can reach the said photographic material, the arrangement being such that adjustment of the position of the said covering member causes an appropriate adjustment of the angle through which in use the measuring wheel must rotate in order that the switching member shall operate the switching means. The switching means is advantageously arranged in use to control the transport of photographic material past the aperture of the mask.

The invention also provides a transport unit for photographic material, which is provided with an exposure mask according to the invention, and is arranged to stop transporting material when the switching member operates the switching means.

With an exposure mask according to the invention a large number of standard print sizes can be set, offering the advantage that only a single mask need be acquired in order for the user to be able to produce prints of all current standard sizes up to the dimensions of the maximum light passage aperture of the mask.

An additional advantage arises from the fact the because a mask blade is continuously adjustable, prints of non-standard sizes can also be produced without the need for expensive special masks to be prepared, as was previously the case.

There is a further advantage for the manufacturers of paper transport units and roll printing apparatus, since only a single exposure mask need be provided for a multiplicity of print sizes, and it is no longer necessary to maintain expensive stocks to cover the large number of masks previously required. The handling of delivery orders is also less complicated, since individual print size requirements, which generally differ a great deal from user to user for the most part need no longer be taken into consideration. For a particular roll printing apparatus, one manufacturer supplies over 20 different standard paper masks, which can be replaced by a single mask according to the invention.

BRIEF DESCRIPTION OF THE DRAWINGS

Two forms of exposure mask constructed in accordance with the invention will now be described by way of example with reference to the accompanying drawings, in which:

FIG. 2 is a top view of the first form of exposure mask to a larger scale than FIG. 1;

FIG. 3 is a side view of the exposure mask as seen in FIG. 2; and

DESCRIPTION OF THE PREFERRED EMBODIMENTS

Figure 1:
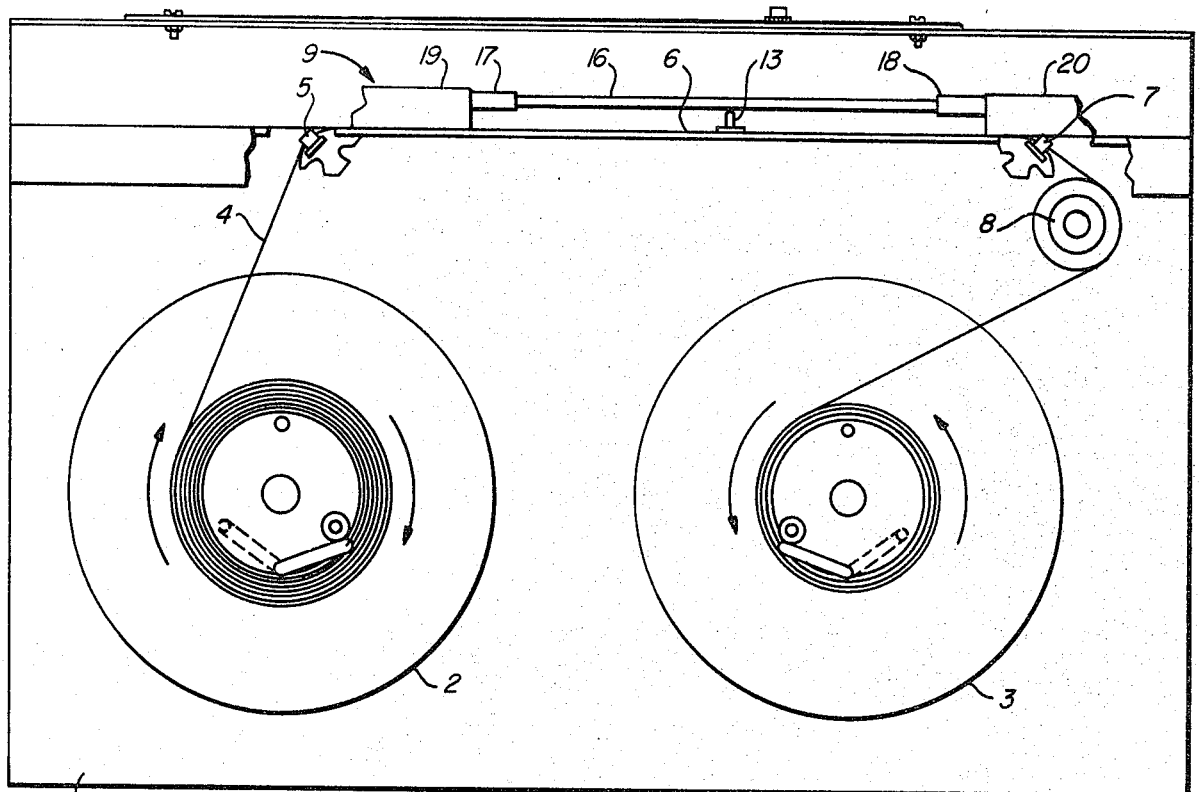
FIG. 1 shows the paper transport unit of a photographic roll printing apparatus fitted with the first form of exposure mask.

A paper-transport unit 1 of a roll printing apparatus comprises a feed reel 2 and a motor-driven take-up reel 3. Photographic paper 4 to be exposed runs from the feed reel 2 by way of a paper guide 5 to an exposure plane 6 and thence by way of a further paper guide 7 and a tensioning roller 8 onto the take-up reel 3, with the coated side of the paper 4 facing upwards in the exposure plane 6. Immediately above the exposure plane 6 is placed the baseplate 10 of the exposure mask, which is a paper mask 9, which has at the edge two apertures 11 and 12 in which engage two corresponding guide pins 13 attached to the exposure plane 6. By this means the exposure mask is accurately positioned in relation to the optical axis a of an exposure and imaging unit which is not shown. The baseplate 10 of the paper mask 9 has a preferably rectangular light aperture 14, which is at least as large as the maximum size of image that is to be printed. For example, the length of the light aperture may be 28 cm and the width 20 cm. Along the length of the light aperture 14 a series of divisions is provided which, starting from the middle of the long side, for example, has continuous numbers going to the left and right (as seen in FIG. 2) so that a double measuring scale 15 is formed.

Above the long side of the light aperture 14 opposite to the measuring scale 15 runs a guide rod 16 which is suitably attached to the baseplate 10 and on which two sliding members 17 and 18 can be moved. Attached to each of the sliding members 17 and 18 is a mask blade, or a covering member, 19 or 20, respectively, which when the mask 9 is placed on the paper web 4 extends just above the mask over the whole breadth of the light aperture 14 parallel to the plane of the paper web 4. In FIG. 2 the mask blade 20 has been shown partially broken away, and those parts of the mechanism that are under the mask blade have been drawn as if the mask blade was not present.

The area of the light aperture 14 can be altered by moving the sliding members 17 and 18 along the guide rod 16. Since the center or zero point marked on the scale is level with the optical axis a of the imaging unit, a symmetrical adjustment of the print size can be obtained by displacing the mask blades 19 and 20 symmetrically in relation to this center point. The current position of the covering members 19 and 20 can be fixed by means of fixing screws 21 and 22 acting on the guide rod 16.

Immediately adjacent to the light aperture 14 there is a measuring wheel 23 which is fixed to an axle 24, which is in turn guided in two bearings 26 and 27 fixed in a housing 25. The housing 25 is attached to the baseplate 10 pivotally about an axis 31 that is eccentric with respect to the axle 24 in such a way that in one orientation of the housing the measuring wheel 23 is in effective contact with the paper 4, and in another orientation of the housing the measuring wheel is out of contact with the paper. The pivoting of the housing 25 is controlled by a solenoid 28 which has its armature connected by way of a link arm 29 with a side member of the housing 25 in such a way that the rotary movement of the housing described previously may be caused by operation of the solenoid. Advantageously, the link arm 29 is rotatable about a fixing screw 30 which is situated on the side member of the housing 25 and the axis of which does not coincide with the rotation axis 31 of the housing. When the soleoid 28 is energized, its armature is moved in the direction of the arrow f in FIGS. 2 and 3 and thus the measuring wheel 23 is pressed against the paper, while when the solenoid 28 is de-energized the housing 25 is pushed away from the baseplate 10 by means of a spring 32 so that the connection between the measuring wheel 23 and the paper 4 is released. Instead of the spring 32 any other suitable method of biasing the housing 25 may be used, for example a spring acting in tension between the armature of the solenoid 28 and an anchorage on the baseplate 10 near the housing 25. The pulling force of the solenoid 28 is such that when it is energized no slip occurs between the measuring wheel 23 and the paper 4 during the forward movement of the latter.

A further rectilinear guide 33, which may be a continuation of the guide rod 16, is provided on which a switching member in the form of a sliding member 34 can slide against the pressure of a spring 35 attached to the guide. Attached to the sliding member 34 there is an axle 36 on which a return pulley 37 is rotatably mounted. In order to secure the sliding member 34 against rotation, the axle 36 engages in a slot (not visible in the drawing) in a member 38 running parallel to the guide.

A drum 39, having a diameter which is, for example, one-half that of the measuring wheel 23, is rigidly connected to the axle 24 of the measuring wheel. Attached to a flange at one side of the drum is one end of a cord 40 which is led round the return pulley 37 and has its other end attached to one of the mask blades 20. The length of the cord is such that in any position of the mask blade 20 the cord 40 remains tensioned by the pressure of the spring 35 situated on the guide 33. By means of an arresting device which is not shown, the position of the drum 39 at the beginning of the transport movement is caused to be such that the cord runs at a tangent to the periphery of the drum, so that a favorable transmission of force from the cord to the drum and vice versa is achieved, and the point of connection of the cord is subjected to the least possible stress. A microswitch 42 is mounted on a lever 43 running at right-angles to the guide 33 and attached to the base plate 10 by means of a screw 41. The lever 43 rests against an eccentric 45 which is also attached to the baseplate by a screw 44.

The method of operation of the device described is as follows: After the end of an exposure, the solenoid 28 is energized and the measuring wheel 23 is thereby pressed against the printing paper 4. The transport motor (not shown) which effects the transport of the paper is then switched on. During the transport movement of the paper 4 the measuring wheel 23 rotates, and with it the drum 39 connected to it, so that the cord 40 is wound up on the drum. Since the mask 20 is firmly clamped in place by means of the screw 22, this winding operation causes the sliding member 34 to travel along the guide 33 until it meets the micro-switch 42 and actuates the switching contact. The latter is so connected with the control device of the apparatus that when the switching contact is actuated the transport motor and the solenoid 28 are switched off. On the one hand, therefore, the printing paper 4 comes to a standstill and on the other hand the measuring wheel 23 is lifted away from the paper 4 by the action of the corresponding spring 32. The core 40 is unwound from the drum 39 again by the spring 35 acting on the sliding member 34, and the latter moves away from the micro-switch 42 again and slides back to its initial position, restoring the original switching state. When the measuring wheel 23 is in the rest position, the distance between the micro-switch 42 and the sliding member 34 depends, as is apparent from the above description and the drawings, on the position of the mask blade 20 to which the cord 40 is attached. If the mask blade 20 is displaced towards the optical center a, the distance between the sliding member 34 and the microswitch 42 is shortened. As a result, the transport distance for the paper is shortened to correspond to the image size determined by the mask position. The transport distance is thus automatically matched to the aperture of the paper mask which has been set.

In order to ensure accurate adjustment of the distance between the sliding member 34 and the micro-switch 42, the exact position of the lever 43 to which the microswitch is attached can be altered by loosening the screws 41 and 44 and moving the eccentric 45.

Only one mask blade 20 is connected with the transport measuring device. The second mask blade 19 is normally adjusted to the same distance from the image center as indicated by the scale 15. The difference in the diameters of the measuring wheel and the drum is the result of adapting the invention to such an arrangement. In other words, movement of mask blade 20 effects a double adjustment of sliding member 34 to take into consideration that the other mask blade 19 is also being moved to further foreshorten the light aperture. The cord 40 and pulley 37 connection between mask blade 20 and sliding member 34 actually moves member 34 only half the distance blade 20 is moved. But the travel path for member 34 to reach micro-switch 42 is only one-quarter of the actual transport distance of the paper because pulley 39 is but one-half the diameter of measuring wheel 24, so there is in fact a double adjustment of the sliding member in relation to its path of travel.

Figure 4:
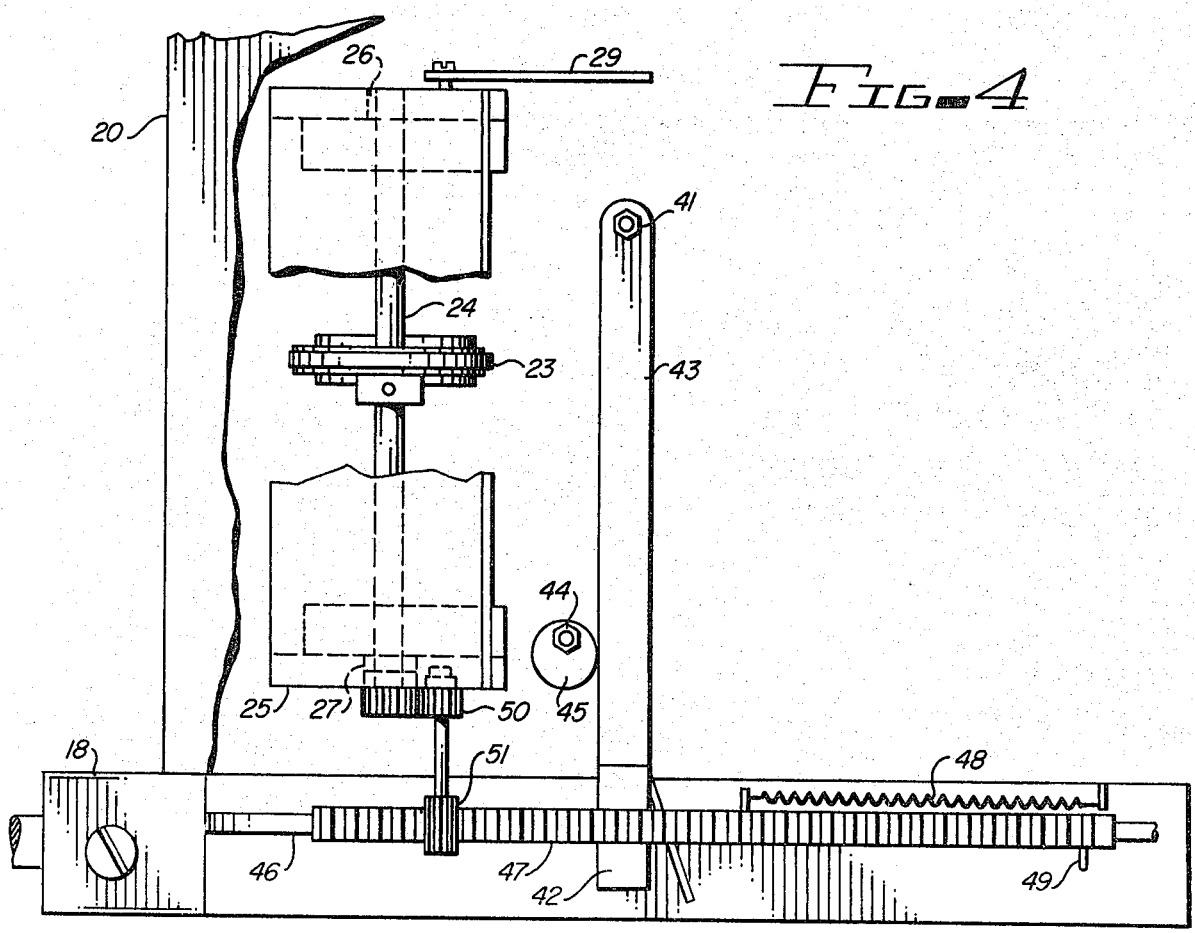
FIG. 4 is a fragmentary diagrammatic view of the second form of exposure mask.

Referring to FIG. 4, in the second form of exposure mask the mask blade 20 has rigidly connected to it a support running parallel to the baseplate, for example a rail 46, on which a rack 47 can slide against the force of a spring 48, On the rack 47 a projection 49 is provided which actuates the micro-switch 42 when the rack 47 is in a corresponding position. In the same way as described previously, the measuring wheel 23 can be brought into effective contact with the paper by way of a solenoid (not shown) and a link 29. Instead of the drum, there is connected to the axle of the measuring wheel 24, by way of a 2 to 1 reducing and reversing gear 50 fixed to the housing 25, a pinion 51 which engages in the rack 47 when the solenoid is energized and which is released from the rack 47 by the action of the spring 32 when the solenoid is de-energized. When the paper is transported, the rack 47 is moved so that the projection 49 approaches the micro-switch 42. When the switching contact of the micro-switch has been actuated the transport motor is switched off as described previously and at the same time the gearwheel connection is released again by the raising of the measuring roller 23. The rack is then returned by the action of the spring 48 to its initial position on the rail, where it is held fast by means of a stop.

In the form of mask just described the pinion 51 can be replaced by a friction wheel and the rack 47 by a friction rod, without any significant change in the operating conditions.

The switching operations described may, instead of being initiated by a micro-switch, be initiated by other switching means actuated by a switching member, for example by using electro-optical or magnetic effects. The exposure mask described may be used not only as a paper mask but also, in certain circumstances, as a film mask, for example in transparency printing apparatus with adjustable film size.

The term "transport" means any movement in the longitudinal direction of photographic material, irrespective as to whether the material is pushed or pulled to move it.

What is claimed is:

1. An exposure mask for photographic material comprising a measuring wheel arranged in use to be caused to rotate by the transport of photographic material past the mask, switching means, a switching member that in use is caused to move towards and operate the switching means in response to the said rotation of the measuring wheel, and at least one adjustable covering member that in use defines an edge extending transversely of the direction of photographic material transport of an aperture through which light can reach the said photographic material, the arrangement being such that adjustment of the position of the said covering member causes an appropriate adjustment of the angle through which in use the measuring wheel must rotate in order that the switching member shall operate the switching means.

2. An exposure mask as claimed in claim 1, wherein the measuring wheel is arranged in use to be pressed against the photographic material during the material transport and lifted away from the photographic material at the end of the material transport.

3. An exposure mask as claimed in claim 2, wherein the measuring wheel is pressed against the photographic material by electrically powered means during the material transport.

4. An exposure mask as claimed in claim 1, wherein in use the switching member is arranged to travel a distance that increases with the angle through which the measuring wheel rotates, and the said appropriate adjustment is an adjustment of the initial distance between the switching member and the switching means.

5. An exposure mask as claimed in claim 1 or claim 4, wherein the switching member is moved during the said rotation of the measuring wheel against the action of a spring which is arranged to return the switching member to its initial position at the end of the material transport.

6. An exposure mask as claimed in claim 1 or claim 4, further comprising a second adjustable covering member defining an edge of the said aperture opposite to the said covering member, the two covering members being arranged to be adjusted by equal amounts to increase or decrease the length of the said opening and the arrangement being such that the appropriate adjustment is appropriate for such equal adjustments.

* * * * *